US008055792B2

(12) United States Patent
Winkler et al.

(10) Patent No.: US 8,055,792 B2
(45) Date of Patent: Nov. 8, 2011

(54) METHOD AND SYSTEM FOR EVALUATING AND SELECTING TRACEROUTES TO BE USED IN DETERMINING THE GEOGRAPHIC LOCATION OF A NETWORK BLOCK

(75) Inventors: Adam Winkler, San Mateo, CA (US); Tobias Speckbacher, Villanova, PA (US); Gary Conner, San Jose, CA (US)

(73) Assignee: Quova, Inc., Mountain View, CA (US)

( * ) Notice: Subject to any disclaimer, the term of this patent is extended or adjusted under 35 U.S.C. 154(b) by 307 days.

(21) Appl. No.: 11/948,771

(22) Filed: Nov. 30, 2007

(65) Prior Publication Data

US 2009/0144411 A1    Jun. 4, 2009

(51) Int. Cl.
*G06F 15/173* (2006.01)
*H04L 12/66* (2006.01)

(52) U.S. Cl. .................. 709/240; 709/238; 370/356
(58) Field of Classification Search .................. 709/238, 709/240; 370/356
See application file for complete search history.

(56) References Cited

U.S. PATENT DOCUMENTS

| 6,684,250 | B2 * | 1/2004 | Anderson et al. ............. 709/225 |
| 6,947,978 | B2 | 9/2005 | Huffman et al. |
| 2002/0021675 | A1 * | 2/2002 | Feldmann .................. 370/254 |
| 2002/0143991 | A1 * | 10/2002 | Chow et al. ................. 709/245 |
| 2003/0074471 | A1 * | 4/2003 | Anderson et al. ............. 709/245 |
| 2003/0110130 | A1 * | 6/2003 | Pelletier ....................... 705/50 |

OTHER PUBLICATIONS

Eriksson, Brian, et al., "A Learning-Based Approach for IP Geolocation", PAM, [Online]. Retrieved from the Internet: <URL: http://nowak.ece.wisc.edu/geoloc1.pdf>, (2010), 10 pgs.
Laki, S, et al., "A Model Based Approach for Improving Router Geolocation", Computer Networks 54, (2010), 1490-1501.

* cited by examiner

*Primary Examiner* — Ranodhi Serrao
(74) *Attorney, Agent, or Firm* — Schwegman, Lundberg & Woessner, P.A.

(57) ABSTRACT

A method and system for evaluating and selecting traceroutes to be used in determining the geographic location of a network block. A particular embodiment of the system includes a set of traceroute feature vector extractors, each traceroute feature vector extractor being associated with at least one of a plurality of traceroutes, each traceroute feature vector extractor being configured to generate a traceroute feature vector for at least one of the plurality of traceroutes; a set of traceroute classifiers each coupled to at least one of the traceroute feature vector extractors, each traceroute classifier being associated with at least one of the plurality of traceroutes, each traceroute classifier being configured to generate at least one traceroute classification and/or regression based on at least one of the traceroute feature vectors; and a traceroute geolocation determining engine.

12 Claims, 18 Drawing Sheets

Last 4 hops of trace #1.
Target IP address: 200.148.169.94

Autonomous system number of target IP Address: 4456

Autonomous system penetration: 0

| Hop # | IP address | known location | autonomous system |
|---|---|---|---|
| 1 | (unknown) | (unknown) | (unknown) |
| 2 | 213.140.43.14 | Madrid, ES | 7203 |
| 3 | 201.63.253.170 | Los Angeles, US | 7203 |
| 4 (last hop) | 201.63.254.77 | Miami, US | 8321 |

Figure 11

Last 4 hops of trace #2.

Target IP address: 200.148.169.94

Autonomous system number of target IP Address: 4456

Autonomous system penetration: 2

| Hop # | IP address | known location | autonomous system |
|---|---|---|---|
| 1 | (unknown) | (unknown) | (unknown) |
| 2 | 213.140.43.41 | Brisbane, AU | 3207 |
| 3 | 201.36.32.88 | Sao Paolo, BR | 4456 |
| 4 (last hop) | 201.36.100.62 | Rio de Janeiro, BR | 4456 |

Figure 12

| ID | Source collector | target IP address | Location of last known router | Collection date | ... |
|---|---|---|---|---|---|
| 1 | 123.234.132.321 (Tokyo, JP) | 24.2.3.1 | (Los Angeles, US) | Oct 28, 2007 | ... |
| 2 | 213.234.132.111 (New York City, US) | 24.2.3.127 | (Long Beach, US) | Oct 10, 2007 | ... |
| 3 | 133.43.56.78 (London, GB) | 24.2.3.255 | (London, GB) | Sept 28, 2007 | ... |
| 4 | 123.234.132.321 (Tokyo, JP) | 24.2.3.200 | (Pasadena, US) | Sept 14, 2007 | ... |

Figure 13

| ID | Country convergence proportion | State convergence proportion | Within 25 miles convergence proportion | City convergence proportion | ... |
|---|---|---|---|---|---|
| 1 | 0.75 | 0.75 | 0.75 | 0.25 | ... |
| 2 | 0.75 | 0.75 | 0.50 | 0.25 | ... |
| 3 | 0.25 | 0.25 | 0.25 | 0.25 | ... |
| 4 | 0.75 | 0.75 | 0.50 | 0.25 | ... |

Figure 14

METHOD AND SYSTEM FOR EVALUATING AND SELECTING TRACEROUTES TO BE USED IN DETERMINING THE GEOGRAPHIC LOCATION OF A NETWORK BLOCK

TECHNICAL FIELD

Various embodiments illustrated by way of example relate generally to the field of geographic location determination and, more specifically, to a method and system for evaluating and selecting traceroutes to be used in determining the geographic location of a network block.

BACKGROUND

Geography plays a fundamental role in everyday life and affects, for example, the products that consumers purchase, shows displayed on TV, and languages spoken. Information concerning the geographic location of a networked entity, such as a network node, may be useful for any number of reasons.

Geographic location may be utilized to infer demographic characteristics of a network user. Accordingly, geographic information may be utilized to direct advertisements or offer other information via a network that has a higher likelihood of being relevant to a network user at a specific geographic location.

Geographic information may also be utilized by network-based content distribution systems as part of a Digital Rights Management (DRM) program or an authorization process to determine whether particular content may validly be distributed to a certain network location. For example, in terms of a broadcast or distribution agreement, certain content may be blocked from distribution to certain geographic areas or locations.

Content delivered to a specific network entity, at a known geographic location, may also be customized according to the known geographic location. For example, localized news, weather, and events listings may be targeted at a network entity where the geographic location of the networked entity is known. Furthermore content may be presented in a local language and format.

Knowing the location of network entity can also be useful in combating fraud. For example, where a credit card transaction is initiated at a network entity, the location of which is known and far removed from a geographic location associated with an owner of the credit card, a credit card fraud check may be initiated to establish the validity of the credit card transaction.

There are various ways to determine the geographic location of a network entity with varying levels of accuracy. The information sources that may be used to assist the determination of the geographic location of a network entity also have varying levels of accuracy and trustworthiness. These information sources are highly dynamic and subject to widely varying levels of accuracy and trustworthiness over time. As such, systems and methods for determining the geographic location of a network entity must also be highly adaptable.

BRIEF DESCRIPTION OF THE DRAWINGS

Embodiments are illustrated by way of example and not limitation in the figures of the accompanying drawings, in which like references indicate similar elements and in which:

FIGS. 11 and 12 illustrate examples of two sets of traceroute information that include an identifier of the associated autonomous system.

FIG. 13 illustrates an example set of traceroute information.

FIG. 14 illustrates convergence proportions of the input traceroutes for each of four defined geographical levels.

DETAILED DESCRIPTION

According to one embodiment, a method and system for evaluating and selecting traceroutes to be used in determining the geographic location of a network block is described.

Other features will be apparent from the accompanying drawings and from the detailed description that follows. In the following description, for purposes of explanation, numerous specific details are set forth in order to provide a thorough understanding of embodiments. It will be evident, however, to one of ordinary skill in the art that the present description may be practiced without these specific details.

For the purposes of the present specification, the term "geographic location" shall be taken to refer to any geographic location or area that is identifiable utilizing any descriptor, metric or characteristic. The term "geographic location" shall accordingly be taken to include a continent, a country, a state, a province, a county, a city, a town, village, an address, a Designated Marketing Area (DMA), a Metropolitan Statistical Area (MSA), a Primary Metropolitan Statistical Area (PMSA), location (latitude and longitude), zip or postal code areas, and congressional districts. Furthermore, the term "location determinant" shall be taken to include any indication or identification of a geographic location.

The term "network address", for purposes of the present specification, shall be taken to include any address that identifies a networked entity, and shall include Internet Protocol (IP) addresses.

Typically, most network addresses (e.g., IP addresses) are associated with a particular geographic location. This is because routers that receive packets for a particular set of machines are fixed in location and have a fixed set of network addresses for which they receive packets. The machines that routers receive packets for tend to be geographically proximal to the routers. Roaming Internet-Ready devices are exceptions. For certain contexts, it is important to know the location of a particular network address or set of addresses. Mapping a particular network address to a geographic location may be termed "geolocation". An exemplary system and methodology by which geographic locations can be derived for a specific network addresses, and for address blocks, are described below. Various methods of obtaining geographic information, combining such geographic information, and inferring a "block" to which a network address corresponds and which shares the same geographic information are described. In a particular embodiment, network blocks can be defined as a set of one or more contiguous IP addresses. Other groupings of network address information can also be considered network blocks and within the scope of the various embodiments described herein.

Figure 1:
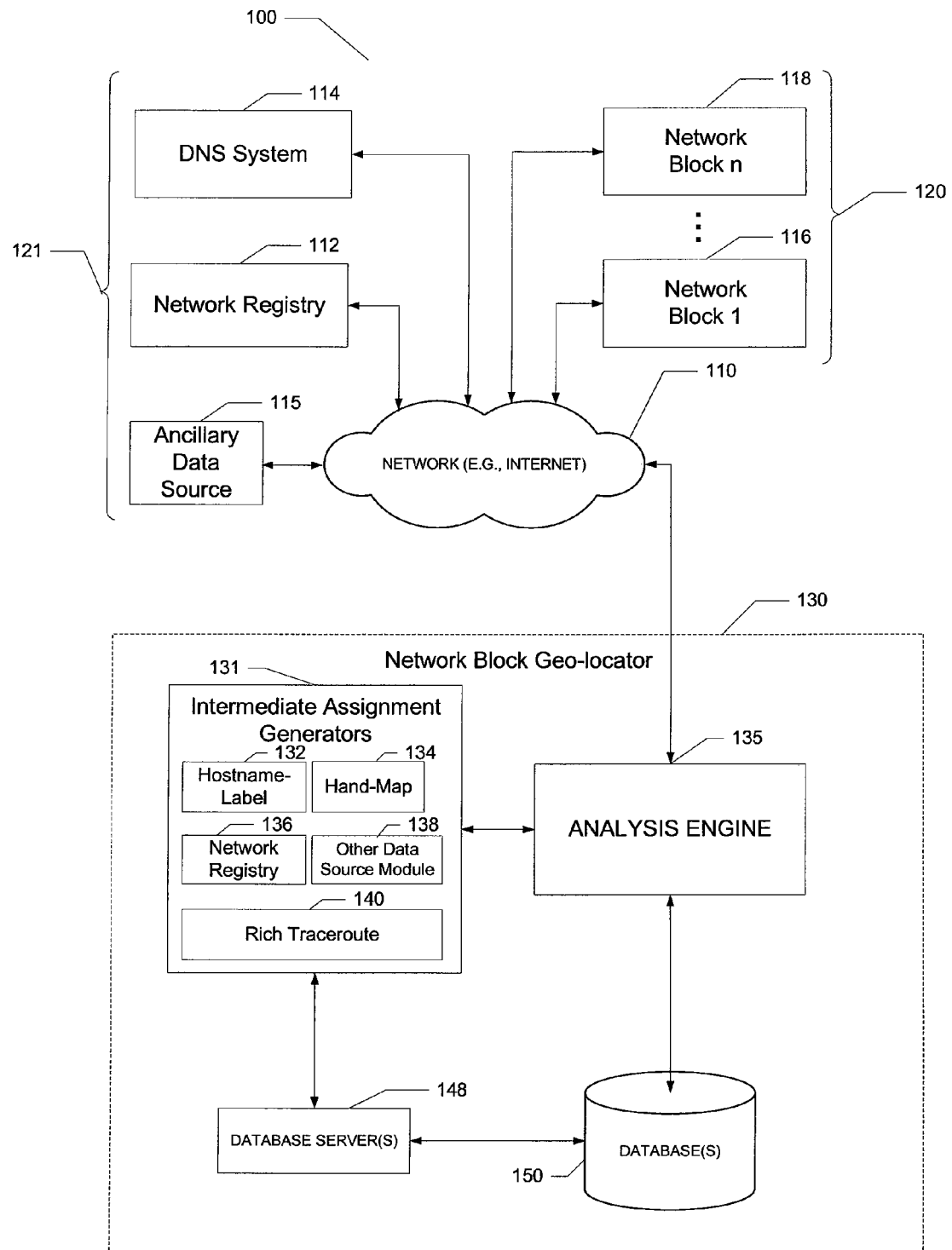
FIG. 1 illustrates a network diagram depicting a system having a set of network blocks and a set of data sources in network communication with a network block geo-locator via network, according to an example embodiment.

FIG. 1 illustrates a network diagram depicting a system 100 having a set of network blocks 116 and 118 (collectively network blocks 120) and a set of data sources 121 (e.g. network registry 112 and Domain Name Server (DNS) System 114) in network communication with a network block geo-locator 130 via network 110, according to an example embodiment. Network blocks 120 represent network entities having network addresses within a defined network block and for which a geographic location can be determined. Data sources 121 represent various data sources from which geo-location data may be collected. These data sources 121 may include, but are not limited to, network registries, DNS servers, network Whois data sources, Border Gateway Protocol (BGP) tables, network administrative data, geographic databases, user demographic/profile information, governmental data sources, remote data collection agents hosted on data collection machines, and the like. In addition, data sources 121 can also include ancillary data source 115 from which other network information can be obtained (e.g. whether a network is routable, the type of data connection, etc.)

Data sources 121 provide geo-location information that may be used to determine the geographic location of a network entity with varying levels of accuracy and trustworthiness. Geo-location information provided by some data sources 121 may be used to validate or corroborate the information provided by other data sources 121. These information sources are highly dynamic and subject to widely varying levels of accuracy and trustworthiness over time. As described in more detail herein, various embodiments provide highly adaptable systems and methods for determining the geographic location of a network entity.

Figure 2:
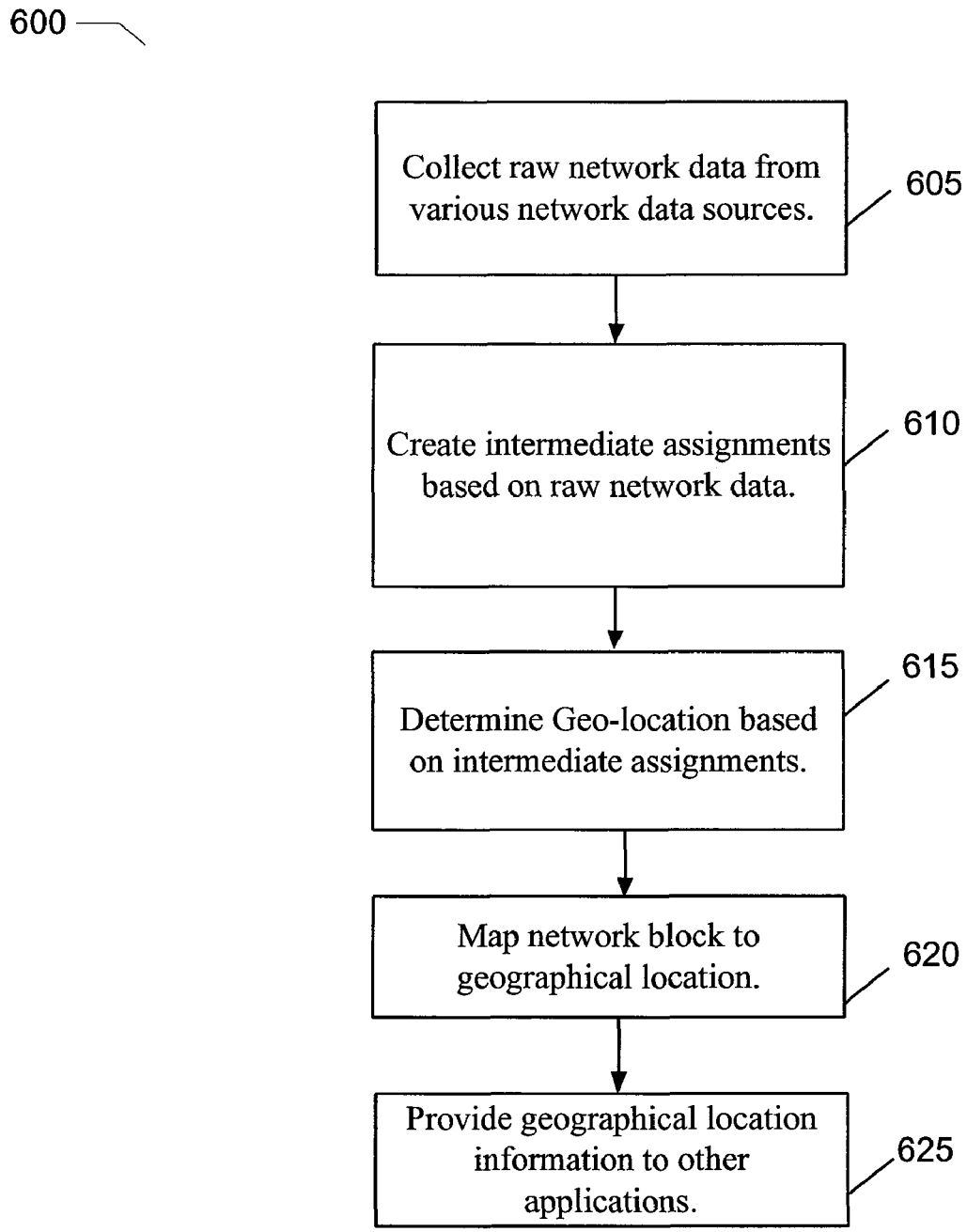
FIG. 2 illustrates an example embodiment of a geolocation determination process based on the intermediate assignments produced by the intermediate assignment generators.

Referring now to FIG. 2, a flow diagram illustrates the basic processing flow in an example embodiment. In processing block 605, the network block geo-locator 130 gathers relevant geo-location data from the data sources 121. This data can include raw data from DNS systems 114, various Internet registries 112, information from traceroutes, and other network data sources. This raw data is processed in processing block 610 to extract geo-location-relevant information from the raw data collected from the data sources 121. This extracted geo-location-relevant information can be used to create intermediate assignments that associates available geo-location-relevant information with the network blocks to which the information relates. In this manner, untested or incomplete geo-location information can be initially associated with particular network blocks. Intermediate assignments are geo-location assignments for a network that are based on distinct data sources and methods. Because the distinct data sources may be of varying reliability and may require specialized processing, the network block geo-locator 130 of an example embodiment described herein provides a separate intermediate assignment generator for each data source 121 from which geo-location-relevant information is obtained. A group of intermediate assignment generators 131 are shown in FIG. 1. In processing block 610 shown in FIG. 2, one or more of these intermediate assignment generators 131 are employed by the network block geo-locator 130 to create intermediate assignments from the raw network data.

In a particular embodiment described herein, traceroute information is used by the rich traceroute intermediate assignment generator 140 to create a rich traceroute intermediate assignment from a plurality of input traceroutes. As will be described in more detail herein, the geographic information associated with a plurality of traceroutes of varying quality and accuracy can be processed to produce an accurate geographic location of a network block based on the rich traceroute intermediate assignment.

As shown in FIG. 1, a particular example embodiment of the group of intermediate assignment generators 131 are shown to include a hostname-label intermediate assignment generator 132, a hand-mapped intermediate assignment generator 134, a network registry intermediate assignment generator 136, a rich traceroute intermediate assignment generator 140, and other intermediate assignment generators 138. Each of the group of intermediate assignment generators 131 are associated with a distinct data source 121. In a particular embodiment, a particular intermediate assignment generator 138 could be associated with a plurality of data sources 121.

In a particular example embodiment, the hostname-label intermediate assignment generator 132 can use the hostname available on the network 110 and perhaps an associated token that may identify a specific country, city, or state associated with the hostname. The hand-mapped intermediate assignment generator 134 can use data provided by network experts who have analyzed a particular network of interest and who have produced geo-location information by hand or using offline automated techniques. The network registry intermediate assignment generator 136 can use network registry information available on the network 110, such as information provided by a well-known WhoIs service. Other available network registry information can also be used to provide or imply geo-location information for the network registry intermediate assignment generator 136.

The rich traceroute intermediate assignment generator 140 uses traceroute information to obtain geo-location information and to generate a rich traceroute intermediate assignment from a plurality of input traceroutes. Tracerouting is a well-known technique for tracing the path of a data packet from a source network entity to a destination network entity. In a particular embodiment, traceroute is a computer network tool used to determine the route taken by packets across an Internet Protocol (IP) network. Tracerouting can use Internet Control Message Protocol (ICMP) packets to accomplish the traceroute. ICMP and its family of versions is one of the core protocols of the Internet protocol suite. It is chiefly used by networked computers' operating systems to send error messages-indicating, for instance, that a requested service is not available or that a host or router could not be reached. Routers, switches, servers, and gateways on the data path can provide geo-location information associated with the source network entity or the destination network entity. In the case where a complete traceroute is available and the very last hop of a traceroute that completed was associated with a given country, state, or city, the rich traceroute intermediate assignment generator 140 can be used to obtain the geo-location data and to create the rich traceroute intermediate assignment. In the case where a complete traceroute is not available or the very last hop of a traceroute that did not actually complete was associated with a given country, state, or city, the rich traceroute intermediate assignment generator 140 can also be used to obtain the available geo-location data and to create the rich traceroute intermediate assignment as best as can be determined from the incomplete data. Similarly, the other intermediate assignment generators 138 can use specific techniques to obtain geo-location information from particular data sources 121 and create the intermediate assignments as best as can be determined from the data obtained from the other data sources.

Referring again to FIG. 2, once the intermediate assignments are created in processing block 610, the network block geo-location is determined based on the intermediate assignments in processing block 615. In this process, a mapping is created from a particular network block to a geographical location. As will be described in more detail below, the analysis engine 135 (shown in FIG. 1) uses the intermediate assignment generators 131 to determine network block geo-location. The mapping of a particular network block to a geographical location is complete in processing block 620 and the geographical location information can be provided to other applications via an interface in processing block 625.

It should be understood that the network block geo-locator 130 described herein can use a plurality of intermediate assignment generators 131. Thus, the architecture of the described embodiments provide a flexible platform in which new network data sources 121 and their corresponding intermediate assignment generators 131 can be quickly added to the network block geo-locator 130 and used for the geo-location analysis. Similarly, the architecture of the described embodiments provide a flexible platform in which traceroutes from a variety of sources and of varying quality can be used to more accurately produce a geo-location for a network block as described herein.

Determining Geolocation from Traceroutes

In the following sections, a particular example embodiment is described for determining geolocation of a network address from network traceroutes. Traceroute or tracerouting describes a process in a data network to identify the route that a particular data packet or set of data packets take from a source node of a network to a target or destination node. In other words, tracerouting is a technique for tracing the path of a data packet from a source network entity to a destination network entity. In a particular embodiment, traceroute is a computer network tool used to determine the route taken by packets across an Internet Protocol (IP) network. Tracerouting can use Internet Control Message Protocol (ICMP) packets to accomplish the traceroute. ICMP and its family of versions is one of the core protocols of the Internet protocol suite. It is chiefly used by networked computers' operating systems to send error messages indicating, for instance, that a requested service is not available or that a host or router could not be reached. Routers, switches, servers, gateways, and the like on the data path can provide geo-location information associated with the source network entity, the destination network entity, and/or intermediate network entities between the source and the destination.

In most cases, the output of a traceroute operation is an identification of a series of routers, along with corresponding hop delays, and some other ancillary data that defines the path from a source node to a destination node. This output is denoted as a traceroute. Essentially, traceroutes provide a complete or partial approximation of the currently active router path from one IP address to another. Traceroutes can be very useful in "geolocating" a network address. It is worth noting that there are various conventional ways of generating these router paths (i.e. traceroutes) from one IP address to another.

It is possible for a source network entity (i.e. node) and a destination node to be in different autonomous network systems. An autonomous system (AS) is a homogenous network including a group of network nodes operating under a common data transfer protocol. Autonomous systems will often use gateways for entry into and out of the autonomous system and to enable data communications with nodes in a different autonomous system. In the context of the Internet, an autonomous system can be a collection of IP networks and routers under the administrative control of one or more entities that present a common routing policy to the Internet. Any routable IP address on the Internet belongs to an autonomous system. The Border Gateway Protocol (BGP) is one of the core routing protocols of the Internet. BGP works by maintaining a table of IP networks or prefixes, which designate network reachability among autonomous systems (AS). The mapping from an IP address to the corresponding autonomous system is implicit in BGP.

Using BGP routing information, we can determine whether a router is in the same autonomous system as the target IP address of a traceroute. We find that a last known router, on a traceroute to a given target IP address, is likely to be geographically closer to the target IP address, if the last known router is in the same autonomous system as the target IP address. Further, a traceroute that has penetrated more deeply into an autonomous system is likely to provide more reliable geographic information. This handling of autonomous system penetration information is described in more detail below.

In order to use traceroutes in an IP geo-location system of an example embodiment, we need to enhance the router information with IP-geolocation data associated with each router, gateway, or other type of network node. For instance, for each router, we may associate a geolocation with that router. The geolocation can be defined in terms of country/city/state/address, country code/zip code, political region, geographic region, latitude/longitude coordinates, polar coordinates, GPS data, cell phone data, direction vectors, proximity waypoints, or any other type of system for defining a geographical location. Using BGP routing information, we can also associate an autonomous system with the router. We can also infer a general geographical boundary of the autonomous system based on the geolocations of the routers of the autonomous system. The enhancement of traceroutes with geolocation information can be denoted enhanced traceroutes or enhanced tracerouting. Using enhanced traceroutes to generate traceroute geolocation classifications and/or regressions based on the traceroute feature vectors can be denoted rich traceroutes or rich tracerouting or rich traceroute.

Figure 3:
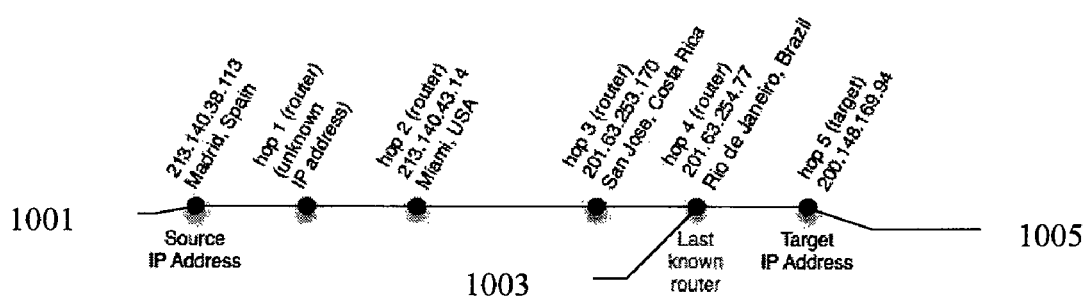
FIG. 3 illustrates a traceroute in which the traceroute is complete and the last router between a source IP address and a target IP address is known.

The geographical locations of routers in the traceroute to a given target IP address can be very useful in determining the geographical location of that target IP address. The geographical location of the last router in a traceroute that reaches its target (i.e. completes) is an important location in the IP geolocation of the target IP address. After all, the last router is just one "hop" away from the target. Because the last router is the closest router to the target in terms of network routing; the last router might also be the closest router geographically. FIG. 3 illustrates this idea with a sample traceroute in which the traceroute is complete and the last router 1003 between a source IP address 1001 and a target IP address 1005 is known to be in Rio de Janeiro, Brazil. In this case, we might think that the target IP address 1005 would also likely be near Rio de Janeiro, Brazil.

Figure 4:
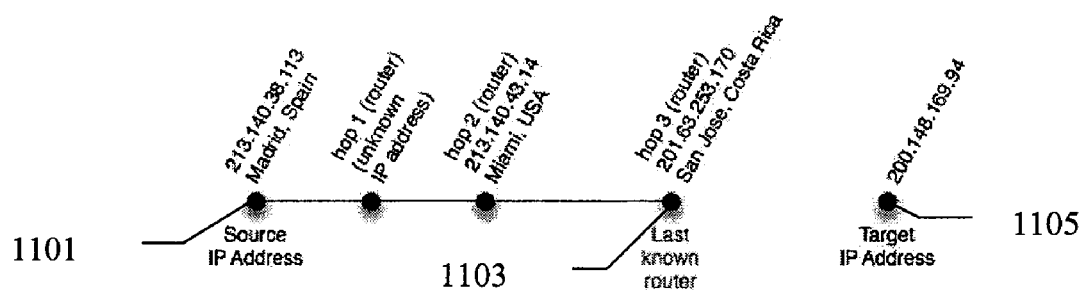
FIG. 4 illustrates a traceroute in which the traceroute is not complete and the last router between a source IP address and a target IP address is not known.

Often traceroutes do not complete; that is, they do not reach their target IP address. This could be due to the target IP address not actually being active. Alternatively, a traceroute may not complete because of firewall and/or network security settings. For example, this situation is illustrated in FIG. 4. As shown, a sample traceroute is incomplete and the last router 1103 of the incomplete traceroute between a source IP address 1101 and a target IP address 1105 may not be the last router to the target IP address 1105. Nevertheless, based on the incomplete traceroute, our best guess for the location of the target IP address 1105 would be San Jose, Costa Rica, the location of the last known router 1105.

Figure 5:
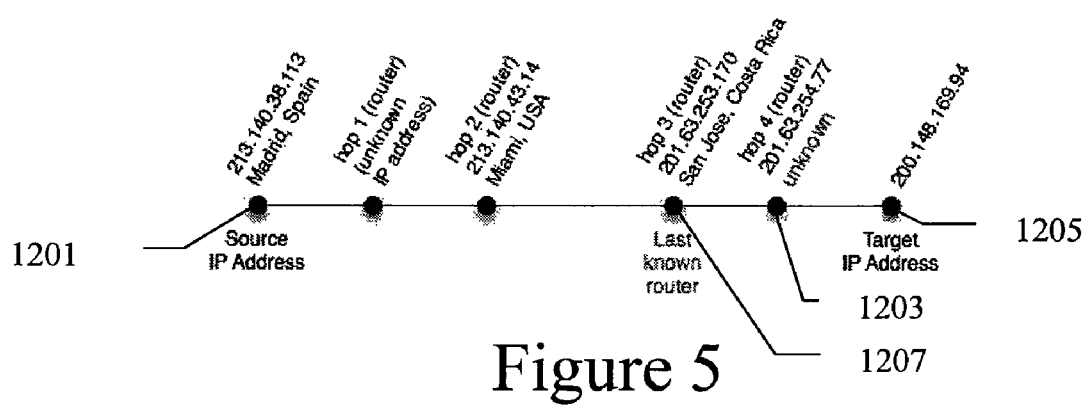
FIG. 5 illustrates a traceroute in which the traceroute is complete; but, the geographic location of the last router of the complete traceroute between a source IP address and a target IP address may not be known with a high degree of confidence.

Sometimes because of the limitations of IP geo-location technology, the geographical location of the router or routers closest to the target IP address is not known with high confidence. For example, this situation is illustrated in FIG. 5. As shown, a sample traceroute is complete; but, the geographic location of the last router 1103 of the complete traceroute between a source IP address 1101 and a target IP address 1105 may not be known with a high degree of confidence. Nevertheless, based on the complete traceroute, our best guess for the location of the target IP address 1105 would be San Jose, Costa Rica, the location of the last known router 1107 for which a geolocation is known with a high degree of confidence.

In all of these cases, the rich traceroutes can be useful in providing an estimate of IP geolocation; but, our confidence in this estimate may vary depending on any limitations there may be in obtaining the traceroute between a source IP address and a target IP address.

The rich traceroute technology of a particular embodiment was designed to fit into a process and system for IP geolocation based on rich tracerouting. In an example embodiment, a process implemented by an embodiment of an IP geolocation system is illustrated in FIG. 6.

Figure 6:
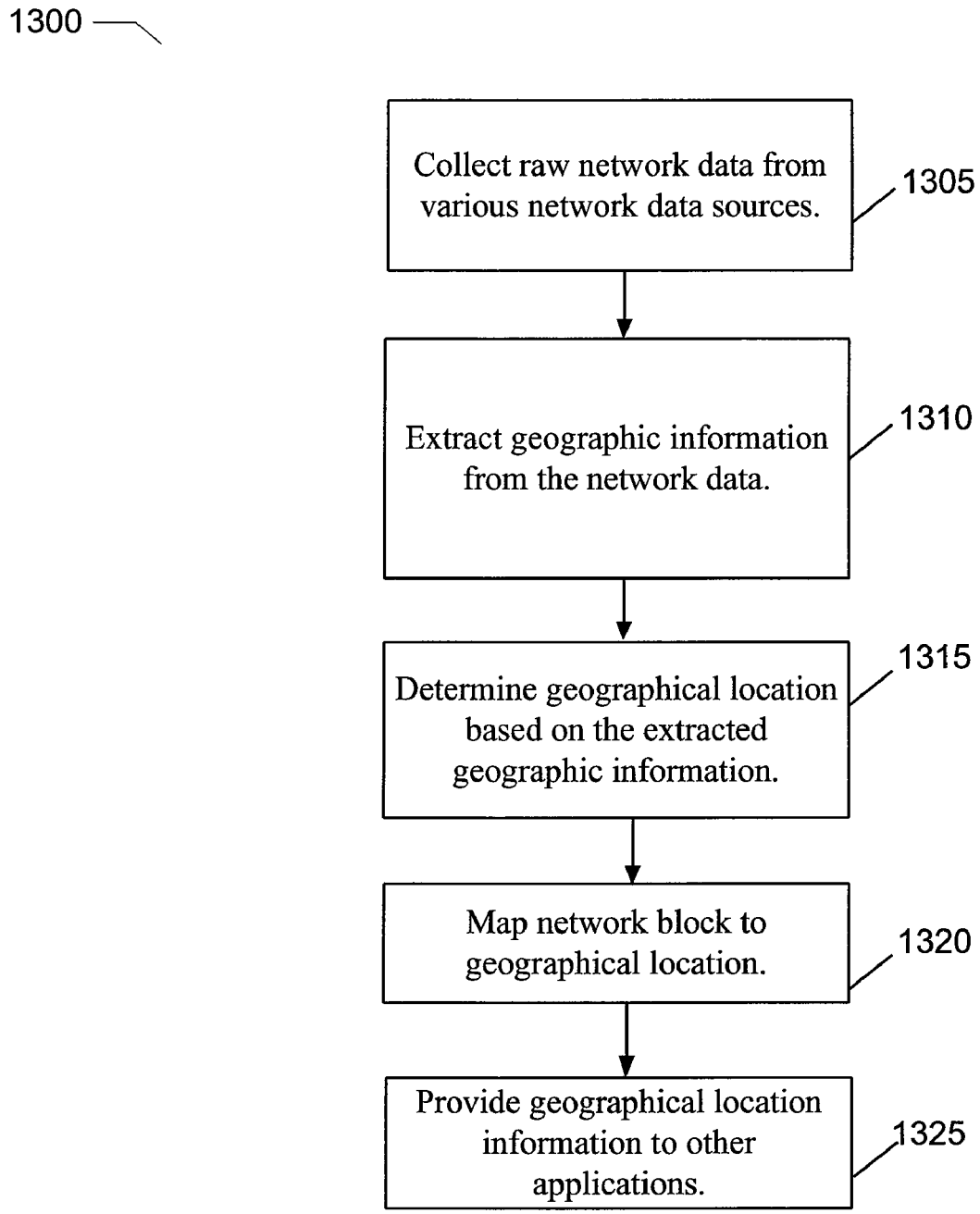
FIG. 6 illustrates an example embodiment of a process for an IP geolocation system.

Referring now to FIG. 6, a flow diagram illustrates the basic processing flow in an example embodiment. In processing block 1305, the network block geo-locator 130 gathers relevant geo-location data from the data sources 121. This data can include raw data from Domain Name Server (DNS) systems 114, various Internet registries 112, information from traceroutes, and other network data sources. Traceroutes can be collected as raw data. This raw data is processed in processing block 1310 to extract geo-location-relevant information from the raw data collected from the data sources 121. Geographic cues from the traceroutes, including determination of our confidence in that data, can be extracted at this point. This extracted geo-location-relevant information can be used to create intermediate assignments (also denoted traceroute location assignments) that associate available geo-location-relevant information with the network blocks to which the information relates. In this manner, untested or incomplete geo-location information can be initially associated with particular network blocks. Intermediate assignments are geo-location assignments for a network that are based on distinct data sources and methods. This geo-location-relevant information is further processed in processing block 1315 to determine a geographical location based on the extracted geo-location-relevant information. The information from rich traceroute and from other IP geolocation data sources, such as whois data, can be used to determine a network block's geographical location. The geographical location is mapped to a network block in processing block 1320. The geographical location and the mapped network block can be provided to other applications in processing block 1325.

Figure 7:
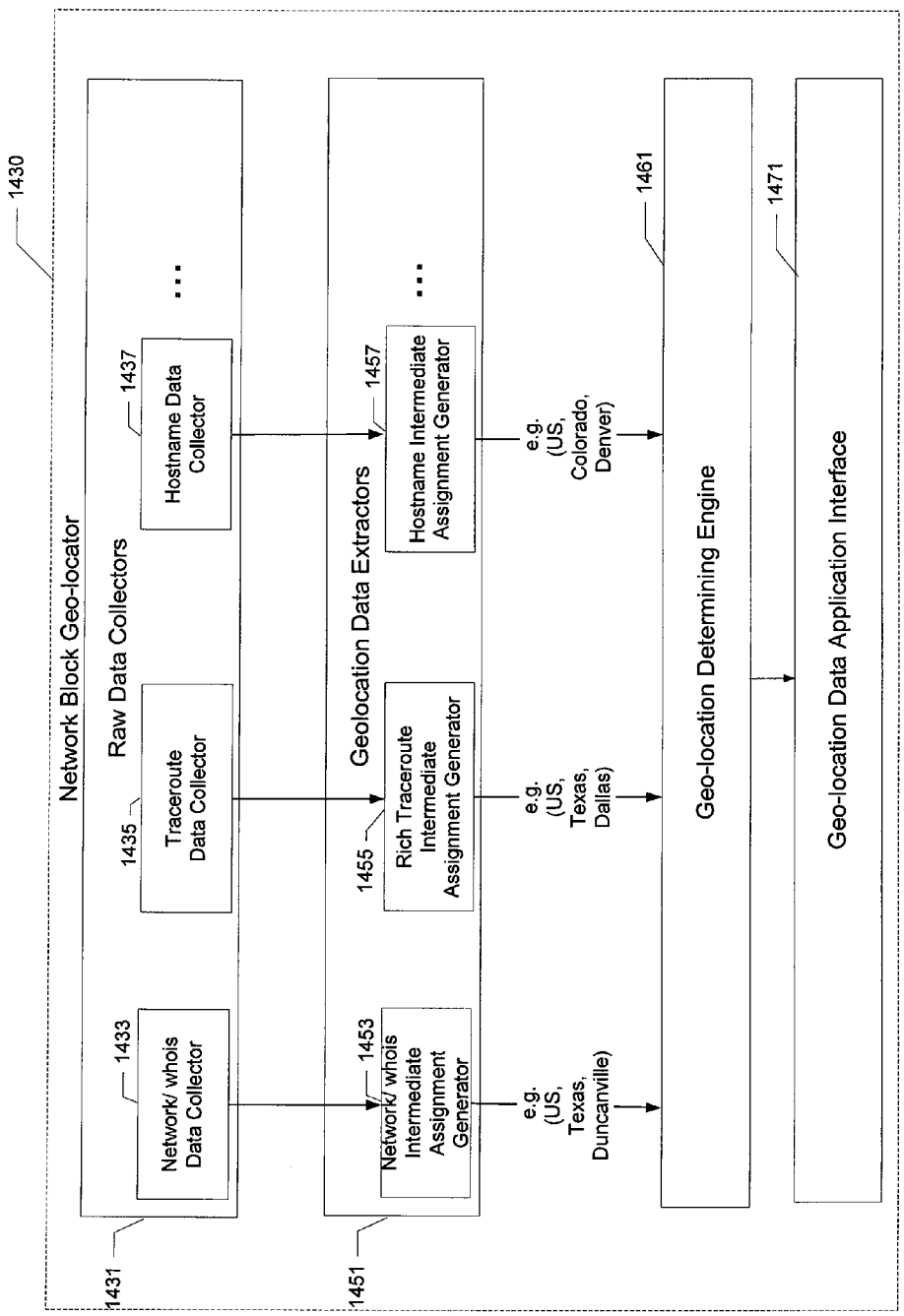
FIG. 7 illustrates a system diagram showing the basic system architecture of an example embodiment.

Referring now to FIG. 7, a system diagram illustrates the basic system architecture of an example embodiment. The example embodiment includes a network block geo-locator 1430, which further includes raw data collectors 1431, geolocation data extractors 1451, a geolocation determining engine 1461, and a geolocation data application interface 1471. Raw data collectors 1431 gather relevant geo-location data from a variety of data sources. These data sources can include network/whois data 1433, hostname data 1437, and traceroute data 1435. Other data sources can similarly be integrated into raw data collectors 1431. The raw data collected from this variety of data sources is provided to a corresponding processing component of geolocation data extractors 1451. For example, the network/whois data collected by the network/whois data collector 1433 is provided to the network/whois intermediate assignment generator 1453. The hostname data collected by the hostname data collector 1437 is provided to the hostname data intermediate assignment generator 1457. The traceroute data collected by the traceroute data collector 1435 is provided to the rich traceroute intermediate assignment generator 1455. The output generated by intermediate assignment generators 1453, 1455, and 1457 includes a geographical location associated with the corresponding raw data along with a confidence value that indicates the level of confidence in the generated geographical locations; this may also include a vector of confidence values in which there is a confidence value for each level of geographical specificity, e.g. (country confidence, state confidence, and city confidence, and the like). An example of this output is shown in FIG. 7. These outputs generated by intermediate assignment generators 1453, 1455, and 1457 are provided to the geolocation determining engine 1461. As will be described in more detail below, geolocation determining engine 1461 aggregates these intermediate assignments and makes a determination of the most likely geographical location based on the collection of intermediate assignments. This geographical location can then be provided to other applications through geolocation data application interface 1471.

For a given network, we will often have more than one traceroute that can be collected for that network. The different traceroutes may vary in several different dimensions of collection, including:

the time and date when the traceroute was collected
the specific target IP address within the network of interest
the network from which the traceroute was collected.

Figure 8:
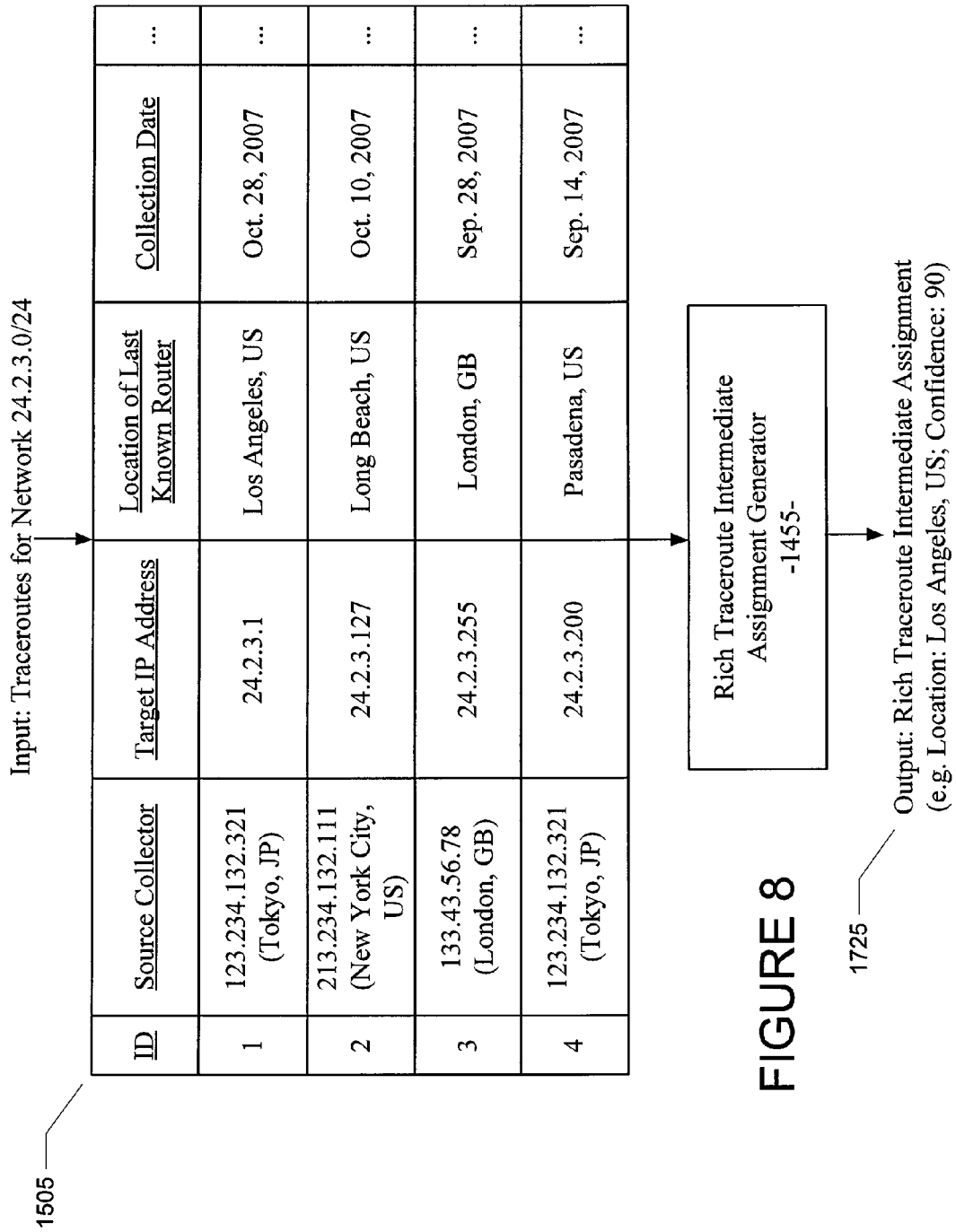
FIG. 8 illustrates an example of the inputs to the rich traceroute process and the generated outputs including one or more rich traceroute intermediate assignments with a geolocation and possibly a confidence value.

All of these variables and other variables may impact the collected traceroutes. If we are using the last known router in the traceroute as our IP geolocation cue, the last known router for these different traceroutes to a given network may vary. Thus, there may be several different IP geolocations for a given network based on these different traceroutes. Therefore, the inputs to the rich traceroute process implemented by the rich traceroute intermediate assignment generator 1455 can be a set of traceroutes, shown as a sample set of traceroutes 1505 in FIG. 8. The output produced by the rich traceroute intermediate assignment generator 1455 can be one or more intermediate assignments 1725 with a geolocation and possibly a confidence value as depicted in FIG. 8.

The rich traceroute system of a particular embodiment may employ classifiers and/or regressors to assess whether, and to what degree, we believe that a given traceroute indicates an accurate assessment of the network's location. We can use classification and/or regression values to choose a geolocation for an intermediate assignment. The classifiers and/or regressors of a particular embodiment are described in more detail below.

The traceroute data collected by collector 1435, as shown in FIG. 7 and described above, is one type of data collected from various data sources. The rich traceroute intermediate assignment generator 1455 assists us to create one or more rich traceroute-based intermediate assignments based on the collected traceroute data. The rich traceroute intermediate assignments generated by the rich traceroute intermediate assignment generator 1455 provides a means to generate one or more traceroute-based geographic locations. Essentially, the rich traceroute technology, as described in more detail herein, allows us to cull out the best traceroute-based geographic location from existing and collected traceroutes. A system configuration for an embodiment of traceroute collection and rich traceroute intermediate assignment generation is shown in FIG. 9.

Figure 9:
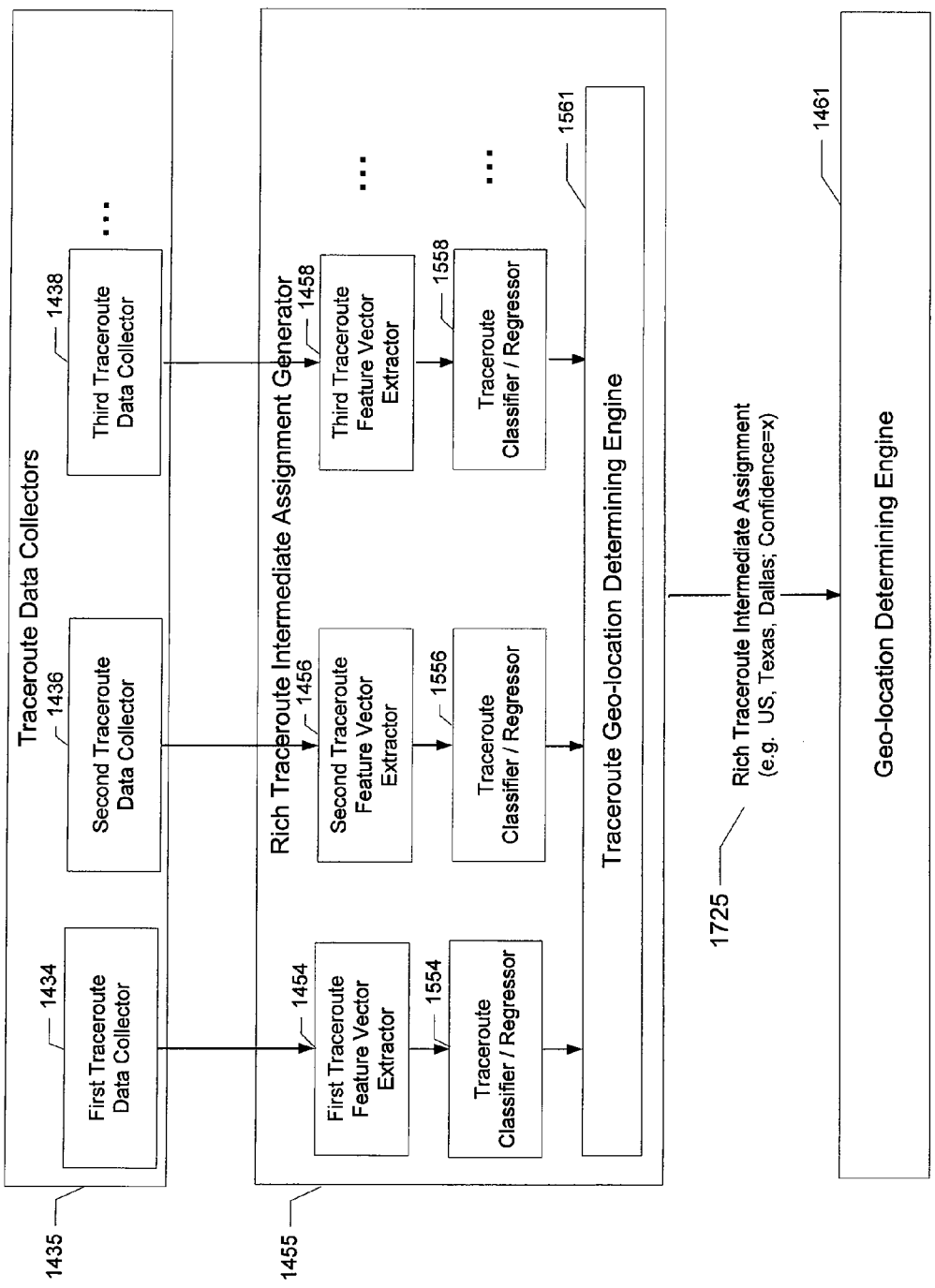
FIG. 9 illustrates a system configuration for an embodiment of traceroute collection and rich traceroute intermediate assignment generation.

Referring to FIG. 9, a detail of the rich traceroute intermediate assignment generator 1455 is shown. Traceroute data collectors 1435 can include a plurality of data collectors 1434, 1436, and 1438, each of which can collect data associated with one traceroute. In this manner, the data associated with a plurality of traceroutes can be collected. The collected traceroute data for each of the plurality of traceroutes can be provided to a corresponding plurality of traceroute feature vector extractors 1454, 1456, and 1458 of rich traceroute intermediate assignment generator 1455. The traceroute feature vectors extracted for each of the plurality of traceroutes are each, individually, fed through a traceroute classifier/regressor; note that modules 1554, 1556, and 1558 contain an identical traceroute classifier/regressor. In an alternative embodiment, a different traceroute classifier/regressor could be selected for each traceroute based on some aspect of the traceroute, such as the location from which it was collected. The output of the traceroute classifiers/regressors 1554, 1556, and 1558, which is a classification, a regression value and geographic location for each traceroute, is provided to a traceroute geolocation determining engine 1561. The traceroute geolocation determining engine 1561 aggregates a collection of traceroute classifier/regressor outputs and determines the best or most reliable geographic location and confidence value based on the traceroute classifier/regressor outputs. The traceroute feature vector extractors and classifier/regressors of a particular embodiment are described in more detail below.

The rich traceroute intermediate assignment generator 1455 can obtain the available geo-location data for a set of collected traceroutes that may be complete or incomplete traceroutes. The rich traceroute intermediate assignment generator 1455 can then create the rich traceroute intermediate assignment as best as can be determined from the input traceroute data. The traceroute feature vector extractors 1454, 1456, and 1468 and traceroute classifiers and/or regressors 1554, 1556, and 1558 of a particular embodiment are described in more detail next.

In general, a classifier is a mapping from a (discrete or continuous) feature space X to a discrete set of labels, Y. A regressor is a mapping from a (discrete or continuous) feature space X to a continuous-valued real number, Z. As is well known generally, the input to a classifier or regressor can be a feature vector of fixed length, M. Each element in the feature vector may be a real number or a discrete categorical item that describes a feature of the traceroute. The general use of feature vectors is well known to those of ordinary skill in the art.

In a particular embodiment, feature vectors may be used to perform classification or regression on input from traceroute data sources. Feature vectors can include a set of attributes associated with a traceroute. Each attribute can be a discrete value or a continuous value (e.g. real number). The value for a particular attribute represents the degree to which that attribute is present (or absent) in the particular traceroute. The combination (aggregate) of each of the attribute values in the feature vector represents a classification or regression value for the particular traceroute.

In a particular embodiment, classifiers and regressors can be created using a supervised learning approach. Supervised learning is a machine learning technique for creating a function from training data. The training data can consist of a set of feature vectors and the desired outputs for each of the feature vectors. Using the supervised learning approach, training data can be compared with the feature vectors associated with particular traceroutes. In this manner, the traceroute geolocation determining engine 1561 can determine how far off a particular traceroute is from a desired output. Further, when training a classifier, it is also possible to generate an error rate estimate for that classifier using a technique such as cross-validation, which is described in more detail below. For a regressor, cross validation can be used to estimate the average error of the regressor.

The rich traceroute system of a particular embodiment as shown in FIG. 9 may employ classifiers and/or regressors 1554, 1556, and 1558 to assess whether, and to what degree, a given traceroute indicates an accurate assessment of a network block's geolocation. The classification and/or regression values can be used by the traceroute geolocation determining engine 1561 to choose a geolocation for a the rich traceroute intermediate assignment.

In a particular embodiment, the process used by the example system shown in FIG. 9 includes the following operations:

1. Extract feature vectors for each traceroute. Feature vectors are extracted by the traceroute feature vector extractors 1454, 1456, and 1458.
2. Run a classifier and regressor over each traceroute, giving a classification and regression for each traceroute. Traceroute classifiers/regressors 1554, 1556, and 1558 are employed for this operation.
    a) if using a classifier, use the labels correctLocation and incorrectLocation as output class labels. These labels can also include information indicating the correctness of the location relative to a particular level of geographic granularity, such as country level, city level, region level, or the like.
    b) if using a regressor, use a first value, such as 100, to indicate that the last known router is correct or very close to the correct location. Use another value, such as 0, to indicate that the last known router is incorrect or very far away from the correct location.
3. Determine a location based on the traceroutes and corresponding classifications and regressions. Traceroute geolocation determining engine 1561 is employed for this operation. One way to do determine a location based on the traceroutes and corresponding classifications and regressions is to select the winner traceroute from the plurality of classifications and/or regressions, in addition to using ancillary information such as the last collection date. If there is no traceroute which can be classified as being in the correctLocation, there may be no winner. In this case, there may be no rich traceroute location assignment for this network block. Based on the selected traceroute, if there is one, the traceroute geolocation determining engine 1561 can create a rich traceroute-based intermediate assignment.

Figure 10A:
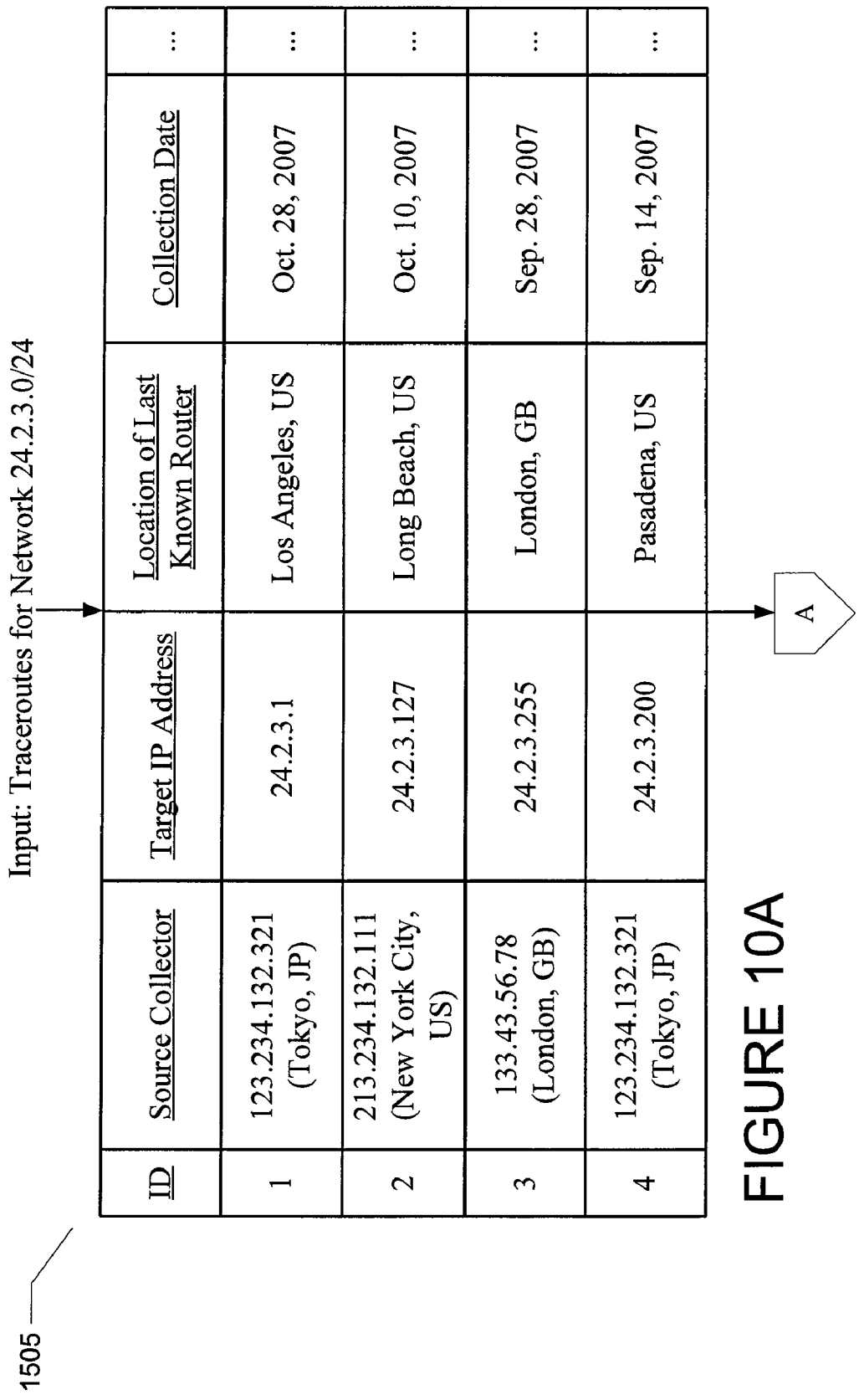
FIGS. 10A-10C illustrate an example of the process used by the example system shown in FIG. 9.
Figure 10B:
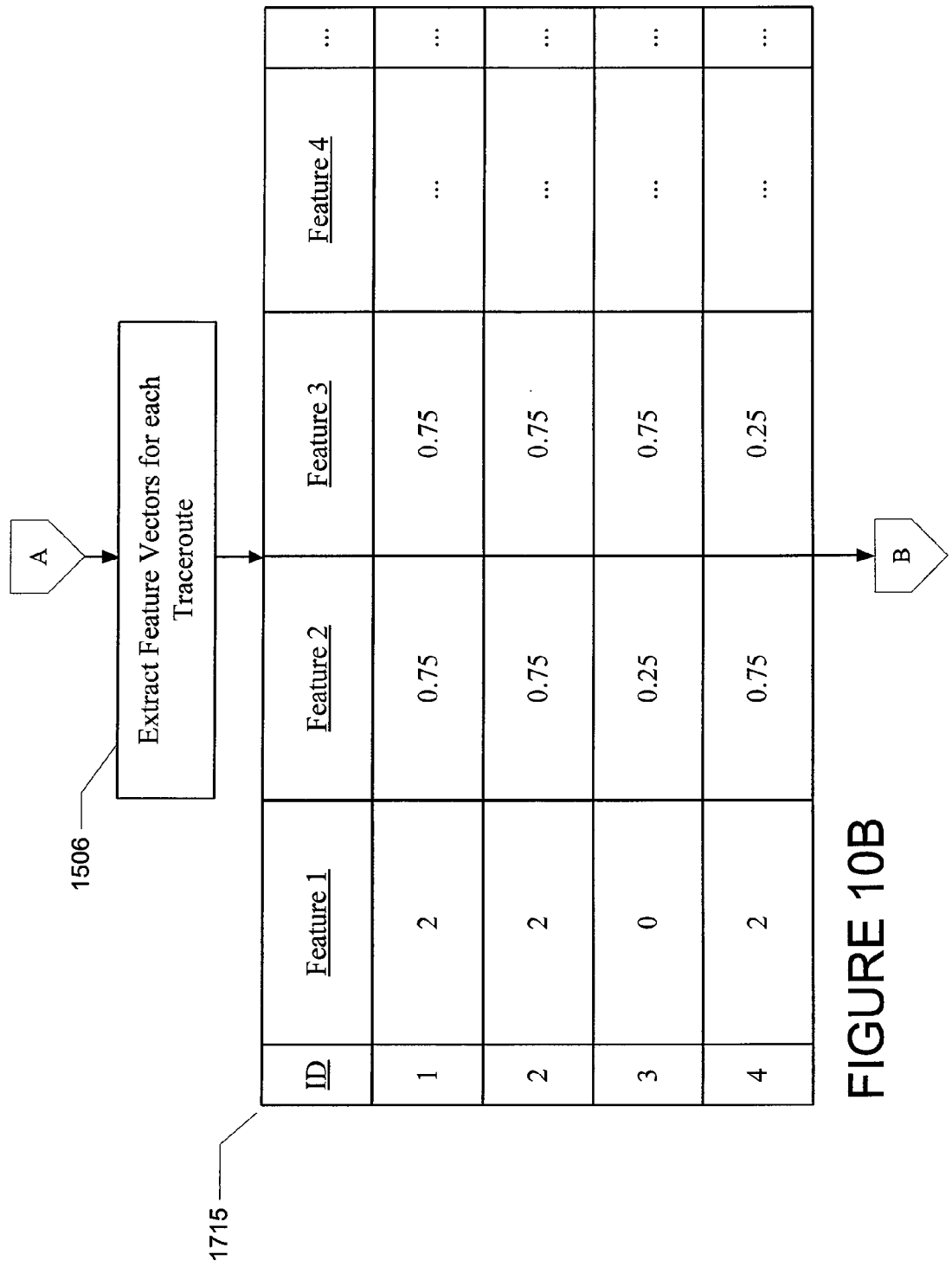
Figure 10C:
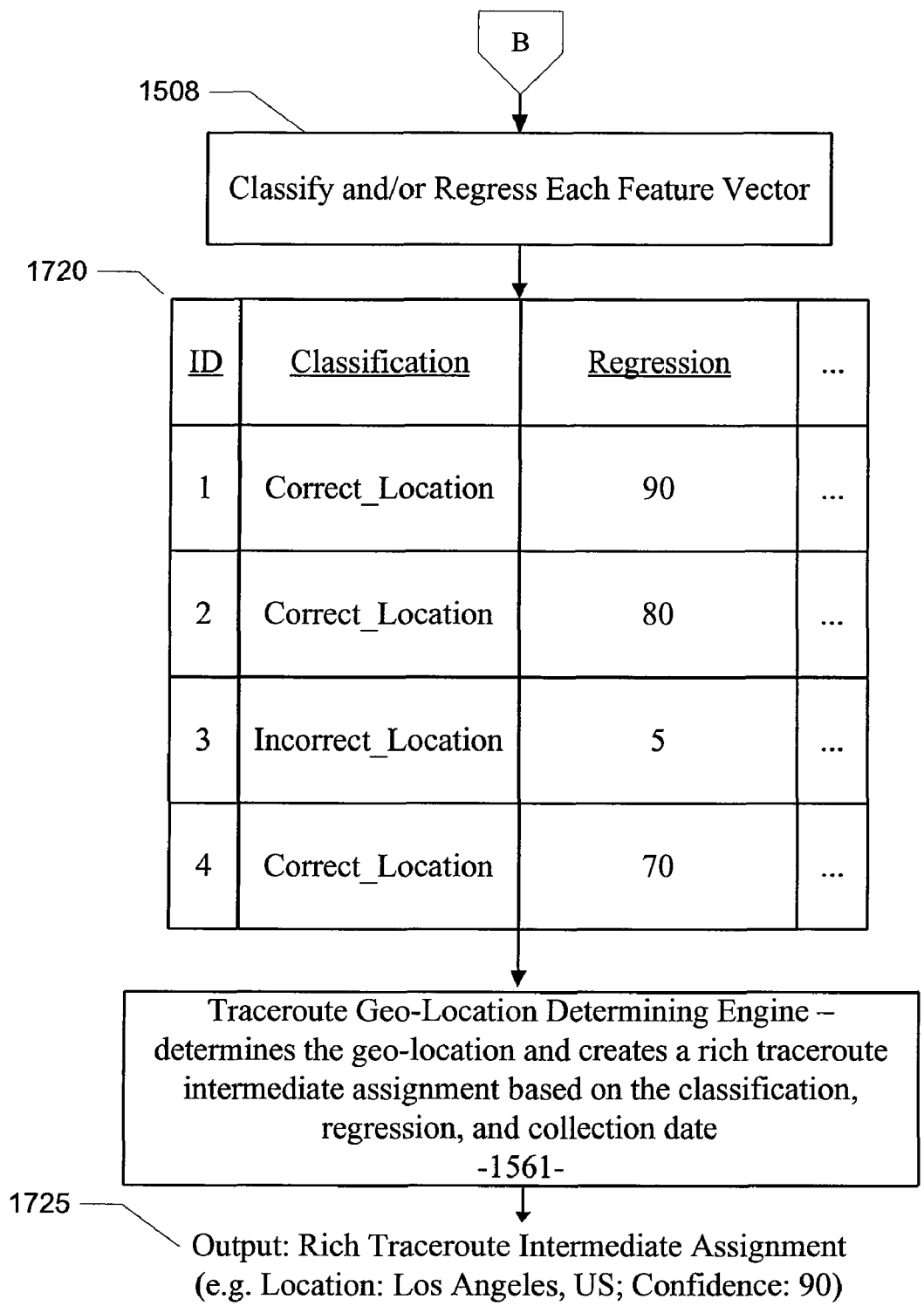

FIGS. 10A-10C illustrate an example of the process used by the example system shown in FIG. 9. In the example of FIGS. 10A-10C, starting at FIG. 10A, a set of traceroutes 1505 is collected by the traceroute data collector 1435. At block 1506 shown in FIG. 10B, this raw traceroute data is provided to the traceroute feature vector extractors 1454, 1456, and 1458 of rich traceroute intermediate assignment generator 1455. The traceroute feature vector extractors 1454, 1456, and 1458 create the feature vectors shown in the example block 1715 in FIG. 10B. At block 1508 shown in FIG. 10C, the feature vectors 1715 are processed by classifiers/regressors 1554, 1556, and 1558. As a result of this processing, the classifiers/regressors 1554, 1556, and 1558 produce a set of classifications and regressions shown in the example block 1720 of FIG. 10C. This set of classifications and regressions is used by the traceroute geolocation determining engine 1561, along with the collected traceroute data, to generate a rich traceroute intermediate assignment 1725 based on the collection of traceroute data and the set of classifications and regressions. This rich traceroute intermediate assignment 1725 can then be provided to the geolocation determining engine 1461.

The processing performed by the traceroute feature vector extractors 1454, 1456, and 1458 is described in more detail next. In a particular embodiment, feature vectors may be used to perform classification or regression on network data sources. Feature vectors can include a set of attributes associated with a network data source and a particular traceroute. Each attribute can be a discrete value or a continuous value (e.g. real number). The value for a particular attribute represents the degree to which that attribute is present (or absent) in the particular data source and/or the particular traceroute. The classifiers and/or regressors 1554, 1556, and 1558 create a classification and/or regression from the feature vector. The resulting classification and/or regression value represents an assessment of the particular network data source and the particular collected traceroute.

For each traceroute in a network under consideration, we generate a feature vector. Any statistical or nominal value, attribute, or characteristic which may help to distinguish a good traceroute, in the IP geolocation sense, from a bad traceroute is of interest. The scope of such variables could be large. For instance, information about the degree to which the traceroute agrees or disagrees with other evidence sources, such as whois and hostname data as shown in FIG. 7, could conceivably be used.

There are several types of statistics which we generate for the traceroute feature vectors in a particular embodiment. These statistics can include the following:

Autonomous system penetration based statistics, which are described in more detail below;
Network-based traceroute convergence statistics, which are also described in more detail below; and
Various other traceroute statistics, such as:
    a distillation of ICMP return message status for the last hop of the traceroute
    whether the traceroute completed
    the number of hops from the traceroute end to the last known router Autonomous System Penetration Based Statistics In this section, we will describe for a particular embodiment some ways in which we can consider the autonomous system of routers in a traceroute, in relation to the target IP address, in order to assess our confidence in the geolocation of the last known router in a traceroute. This is an especially powerful approach in cases where a traceroute's last known router is not: (a) the last router, and (b) from a complete traceroute.

In a particular embodiment, autonomous system penetration is defined herein for a router on a traceroute. Autonomous system penetration is the count of hops on the traceroute from the first hop that enters the target autonomous system to the last known router of the traceroute, where all of the known routers in between are also within the target autonomous system. We find that if the last known router of a traceroute is in the same autonomous system as the target, the geographical location of the last known router is more likely to be closer to a target IP address. Moreover, the deeper the autonomous system penetration, the closer the last known router tends to be geographically to the target IP address.

FIGS. 11 and 12 illustrate examples of two sets of traceroute information that include an identifier of the associated autonomous system. In the example of FIG. 11, the last hop (#4) is not within the same autonomous system as the previous hop. As such, the autonomous system penetration value for this traceroute is zero (0). In the example of FIG. 12, the last hop (#4) is within the same autonomous system (4456) as the previous hop. As such, the autonomous system penetration value for this traceroute is two (2). Given the higher autonomous system penetration value for this traceroute, the geolocation associated with the last hop in the traceroute shown in FIG. 12 can be considered more likely closer to the target IP address than the traceroute shown in FIG. 11, because of the deeper autonomous system penetration.

Another useful concept is that of autonomous system size. In a particular embodiment, we define autonomous system size as the number of IP addresses that are currently routable within a given autonomous system. Another very useful statistic for predicting the closeness of a last known router to the true location of a target IP address is the ratio of the autonomous system penetration and autonomous system size; we call this ratio the autonomous system penetration to size ratio. These autonomous system statistics can be added to the feature vectors generated for a particular traceroute by the rich traceroute intermediate assignment generator 1455.

Network-Based Traceroute Convergence Statistics

In a particular embodiment, we tend to trust the geolocation associated with a particular traceroute when its geolocation is the same, or close to, the geolocation associated with several other traceroutes in the same network. The complement is also true: we tend to distrust the geolocation associated with a particular traceroute when its geolocation is substantially different than other traceroutes for the same network. The degree to which different traceroutes for a network converge/agree or diverge/disagree on IP geolocation correlates with the goodness (e.g. accuracy or reliability) of the traceroute's geolocation. Thus, statistics that indicate convergence are useful features in allowing the rich traceroute technology to determine traceroute utility. These convergence statistics can be added to the feature vectors generated for a particular traceroute by the rich traceroute intermediate assignment generator 1455.

In this section we will identify several traceroute convergence statistics that may be used. For a given network, we will often have more than one traceroute that we have collected for that network. The different traceroutes may vary in several different dimensions of collection, for example:
    the time when the traceroute was collected
    the specific target IP address within the network of interest.
    the network from which the traceroute was collected.

All of these variables may impact the collected traceroutes. If we are using the last known router in the traceroute as our IP geolocation cue, the last known router for these different traceroutes to a given network may vary. Thus, there may be several different IP geolocations for a given network based on these different traceroutes.

Referring to FIG. 13, an example set of traceroute information is shown. For each traceroute, the source collector, the target IP address, the location of the last known router, and the traceroute collection date is provided. Assume, for example, that we define four different geographical levels of interest: country, state, "within 25 miles," and city. Using these geographical levels, our convergence statistics could just be the proportion of traceroutes that matched at the given level, for a given traceroute. In this case, the statistics would look like the table shown in FIG. 14.

FIG. 14 illustrates the convergence proportions of the input traceroutes for each of the four defined geographical levels. These convergence proportions provide further information on the reliability of the geolocations associated with each of the corresponding traceroutes. These convergence proportions can be added to the feature vectors generated for a particular traceroute by the rich traceroute intermediate assignment generator 1455.

Traceroute Classifiers and Regressors

In order to use a supervised technique to train a classifier or regressor in a particular embodiment, one needs feature vectors along with the desired classifier or regressor output for each feature vector. In the case of a classifier, the desired output is a label. In the case of a regressor, the desired output is a number.

For our purposes of determining which traceroutes are useful, we advocate the labels (or some similar set): correctLocation or incorrectLocation. It is important to have some way of assessing, or at least approximating, the correct (true) location of nodes in a given network. This network truth can be based on many different sources, such as a trusted source or the analysis of some network-geographic specialists who have a database of network information at their disposal. These true network node geolocations can be obtained from a variety of sources, including: 1) the analysis provided by a network-geographic analyst (e.g. someone who has the expertise in determining the likely geographic location associated with a network), or 2) an external corroboration source, such as a GPS system attached to a client computer system, or a trusted postal address provided by a user from the address. The desired outputs can be associated with each of the corresponding feature vectors to enable the classifiers 1554, 1556, and 1558 to appropriately classify each of the intermediate assignments. Each of the classifiers 1554, 1556, and 1558 can produce a classification (e.g. correct or incorrect) and/or a regression value (e.g. 0.0 to 1.0) based on an analysis of the intermediate assignment feature vectors and the corresponding desired output training data.

When training a regressor, we could just assign some number to correspond with the correctLocation or incorrectLocation labels. For instance, we could use 100 to designate a correct location and 0 to designate an incorrect location. Or alternately, we could designate the distance, or some function of the distance, as the desired output.

Regarding regressors, it may be useful to note that many classifiers themselves essentially generate regressions. For instance, a multilayer perception often generates a sigmoid function as its output. That sigmoid function could be used directly as a regression or it can be thresholded to indicate a label.

Rich Traceroute Location Determination

Based on the traceroutes and the classifications and/or regressions for those traceroutes, we determine a geolocation for the network for this intermediate assignment. In a particular embodiment, we assume that the location of the last known router of a traceroute is used as the location of the traceroute. We use some simple heuristics for location determination. For example:

An example of a simple heuristic would be to choose the last collected traceroute whose classification was correctLocation.

Another example of a simple heuristic would be to choose the traceroute whose regression value was the largest, and break ties based on collection date, choosing the latest traceroute having the maximum regression value.

Yet another alternative would be to interpolate the location from the set of traceroutes whose classification was correctLocation Applicability at Different Levels of Geographical Coarseness Note that the rich traceroute system and method described herein can apply at any geographic level of coarseness. At these different levels, the criterion for asserting that a last known router assignment location is correct may also change. Different levels of geographic coarseness may include, for example:

continent
country
region
state
city
postal code
latitude/longitude

The criterion used for a location to be correct, for example, at the city level, may allow the last known router to be within 25 miles of the location that is assessed to be the correct location.

Figure 15:
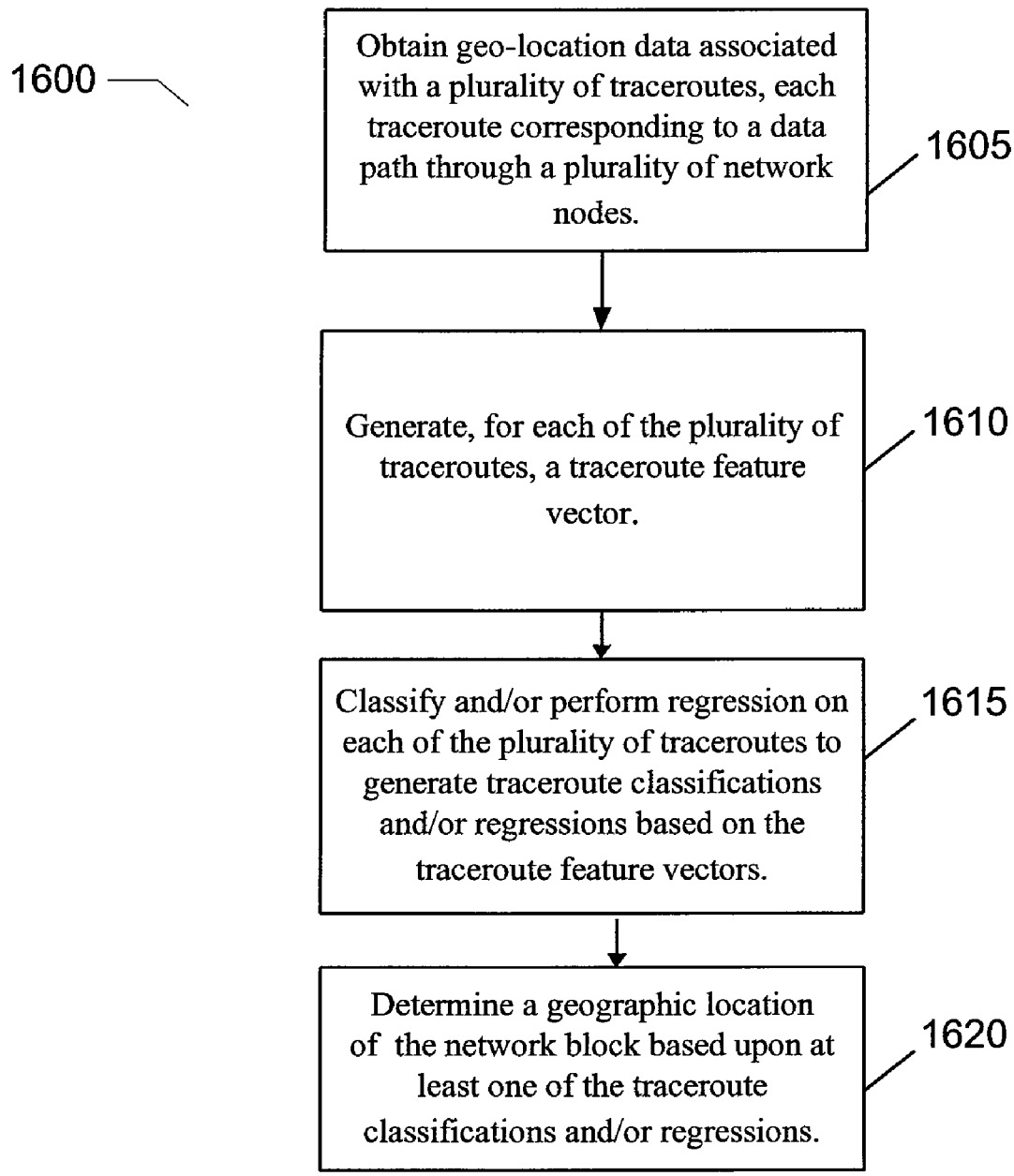
FIG. 15 illustrates an example method of assigning a geographic location to a network block in a particular embodiment.

FIG. 15 illustrates an example method of assigning a geographic location to a network block in a particular embodiment. In processing block 1605, the network block geo-locator obtains geo-location data associated with a plurality of traceroutes, each traceroute corresponding to a data path through a plurality of network nodes, generates, for each of the plurality of traceroutes, a traceroute feature vector (processing block 1610), classifies and/or performs regression on each of the plurality of traceroutes to generate traceroute classifications and/or regressions based on the traceroute feature vectors (processing block 1615), and determines a geographic location of the network block based upon at least one of the traceroute classifications and/or regressions (processing block 1620). In processing block 1620, a rich traceroute intermediate assignment is generated and a corresponding geographic location of the network block is determined from the rich traceroute intermediate assignment.

Figure 16:
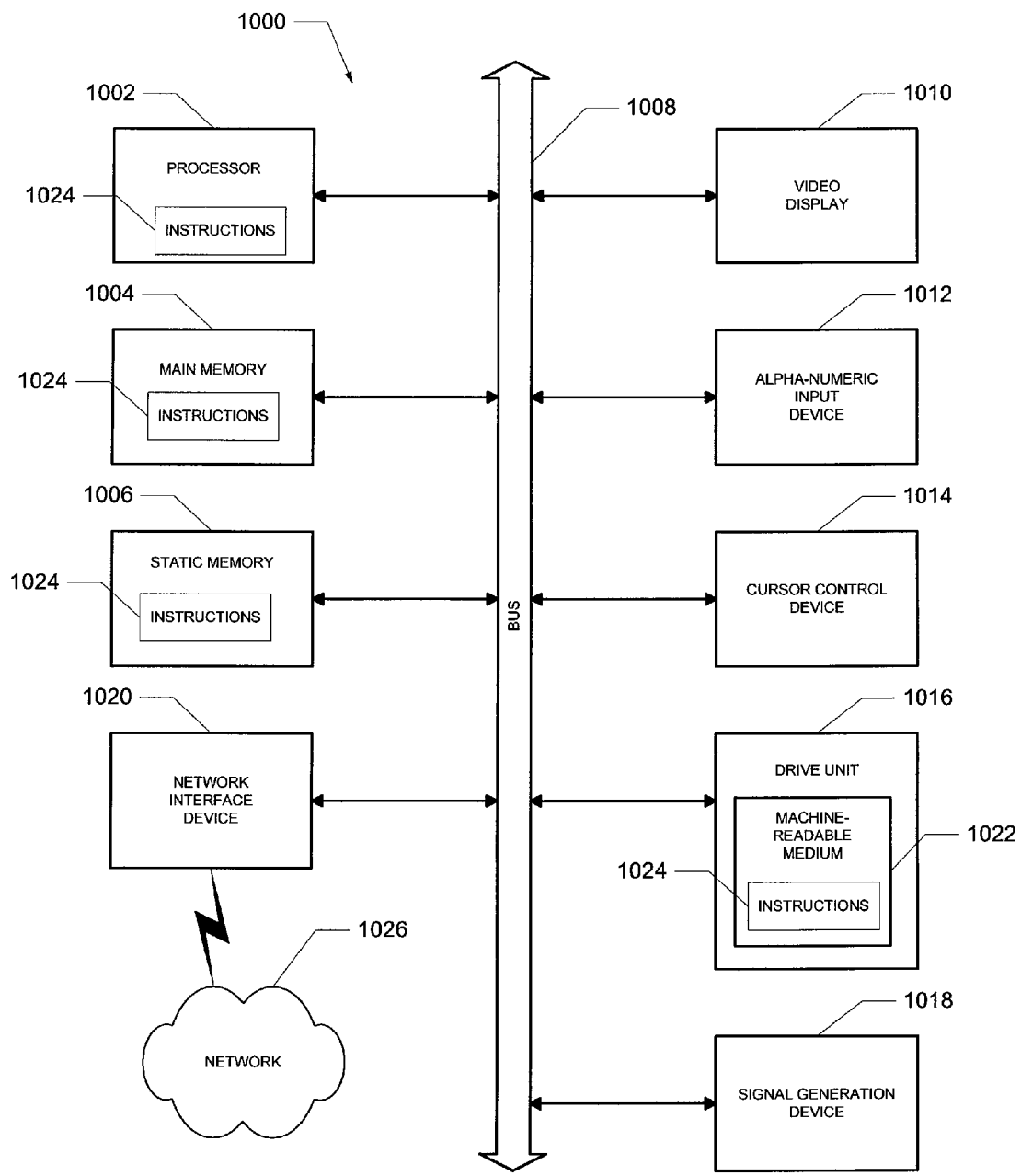
FIG. 16 shows a diagrammatic representation of a machine in the example form of a computer system.

FIG. 16 shows a diagrammatic representation of a machine in the example form of a computer system 1000 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions (e.g., software 1024) embodying any one or more of the methodologies or functions described herein. The instructions 1024 may also reside, completely or at least partially, within the main memory 1004, the static memory 1006, and/or within the processor 1002 during execution thereof by the computer system 1000. The main memory 1004 and the processor 1002 also may constitute machine-readable media. The instructions 1024 may further be transmitted or received over a network 1026 via the network interface device 1020.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In example embodiments, a computer system (e.g., a standalone, client or server computer system) configured by an application may constitute a "module" that is configured and operates to perform certain operations as described herein below. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any non-transitory medium that is capable of storing, encoding or carrying a set of instructions for execution by the machine and that cause the machine to perform any one or more of the methodologies of the present description. The term "machine-readable medium" shall accordingly be taken to include, but not be limited to, solid-state memories, optical and magnetic media.

As noted, the software may be transmitted over a network using a transmission medium. The term "transmission medium" shall be taken to include any medium that is capable of storing, encoding or carrying instructions for transmission to and execution by the machine, and includes digital or analog communications signal or other intangible medium to facilitate transmission and communication of such software.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. The figures herein are merely representational and may not be drawn to scale. Certain proportions thereof may be exaggerated, while others may be minimized. Accordingly, the specification and drawings are to be regarded in an illustrative rather than a restrictive sense.

The following description includes terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R. §1.74(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the Detailed Description, with each claim standing on its own as a separate embodiment.

Thus, a method and system for evaluating and selecting traceroutes to be used in determining the geographic location of a network block have been described. Although embodiments have been described with reference to specific example embodiments, it will be evident that various modifications and changes may be made to these embodiments without departing from the broader spirit and scope of embodiments as expressed in the subjoined claims.

What is claimed is:

1. A method of determining a geographic location of a network block comprising:
obtaining geo-location data associated with a plurality of traceroutes, each traceroute corresponding to a data path through a plurality of network nodes;

generating, for each of the plurality of traceroutes, a traceroute feature vector, each traceroute feature vector including a plurality of attributes associated with a particular traceroute of the plurality of traceroutes, a value for a particular attribute of the plurality of attributes representing a degree to which that attribute is present or absent in the particular traceroute, the plurality of attributes being associated with a plurality of network data sources and a particular traceroute, the plurality of network data sources providing statistics related to each of the plurality of attributes;

providing a plurality of traceroute data collectors, each being associated with at least one of the plurality of traceroutes;

providing a plurality of traceroute classifiers, each being associated with at least one of the plurality of traceroute feature vectors;

classifying and/or regressing, by use of a processor, each of the plurality of traceroutes to generate traceroute classifications and/or regressions based on the traceroute feature vectors; and determining a geographic location of the network block based upon at least one of the traceroute classifications and/or regressions.

2. The method of claim 1 wherein each of the plurality of traceroutes may be complete or incomplete traceroutes.

3. The method of claim 1 wherein the determined geographic location is associated with a best traceroute classification and/or regression.

4. The method of claim 1 including providing a traceroute geolocation determining engine that receives input from the plurality of traceroute classifiers.

5. The method of claim 1 wherein the geographic location is assigned on a country level, a state level, a city level, a zip code level, and/or a specific coordinate level.

6. The method of claim 1 including using supervised learning techniques to classify and/or regress each of the plurality of traceroutes to generate traceroute classifications and/or regressions based on the traceroute feature vectors and training data.

7. The method of claim 1 wherein the determined geographic location of the network block is based upon an interpolation between at least two of the traceroute assignment classifications and/or regressions.

8. The method of claim 1 including using autonomous system penetration data of each traceroute in generating each traceroute's feature vector.

9. An article of manufacture comprising:

a non-transitory machine-readable storage medium having machine executable instructions embedded thereon, which when executed by a machine, cause the machine to:

obtain geo-location data associated with a plurality of traceroutes, each traceroute corresponding to a data path through a plurality of network nodes;

generate, for each of the plurality of traceroutes, a traceroute feature vector, each traceroute feature vector including a plurality of attributes associated with a particular traceroute of the plurality of traceroutes, a value for a particular attribute of the plurality of attributes representing a degree to which that attribute is present or absent in the particular traceroute, the plurality of attributes being associated with a plurality of network data sources and a particular traceroute, the plurality of network data sources providing statistics related to each of the plurality of attributes;

provide a plurality of traceroute data collectors, each being associated with at least one of the plurality of traceroutes;

provide a plurality of traceroute classifiers, each being associated with at least one of the plurality of traceroute feature vectors;

classify and/or regress each of the plurality of traceroutes to generate traceroute classifications and/or regressions based on the traceroute feature vectors; and determine a geographic location of the network block based upon at least one of the traceroute classifications and/or regressions.

10. The article of manufacture of claim 9 wherein the determined geographic location is associated with a best traceroute classification and/or regression.

11. The article of manufacture of claim 9 being further configured to provide a traceroute geolocation determining engine that receives input from the plurality of traceroute classifiers.

12. The article of manufacture of claim 9 wherein the geographic location is assigned on a country level, a state level, a city level, a zip code level, and/or a specific coordinate level.

* * * * *

UNITED STATES PATENT AND TRADEMARK OFFICE
CERTIFICATE OF CORRECTION

PATENT NO. : 8,055,792 B2
APPLICATION NO. : 11/948771
DATED : November 8, 2011
INVENTOR(S) : Adam Winkler et al.

It is certified that error appears in the above-identified patent and that said Letters Patent is hereby corrected as shown below:

In column 4, line 49, delete "Whols" and insert -- Whois --, therefor.

In column 10, line 34, delete "a the" and insert -- the --, therefor.

In column 13, line 64, delete "perception" and insert -- perceptron --, therefor.

Signed and Sealed this
Twenty-fourth Day of January, 2012

David J. Kappos
*Director of the United States Patent and Trademark Office*